McD. Darrow,
Check Rein Clasp,
N° 68,172.   Patented Aug. 27, 1867.
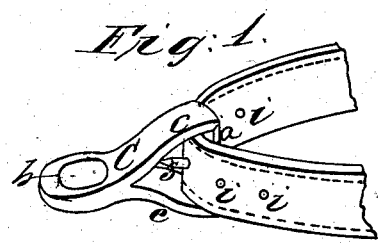
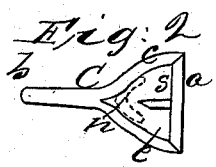
Witnesses:
Inventor:
McDowell Darrow

United States Patent Office.

McDOWELL DARROW, OF GATES, NEW YORK, ASSIGNOR TO HIMSELF AND O. W. HART, OF SAME PLACE.

Letters Patent No. 68,172, dated August 27, 1867.

IMPROVED CHECK-REIN HOLDER.

*The Schedule referred to in these Letters Patent and making part of the same.*

TO ALL WHOM IT MAY CONCERN:

Be it known that I, McDOWELL DARROW, of Gates, in the county of Monroe, and State of New York, have invented a new and useful "Check-Rein Holder or Guide;" and I do hereby declare that the following is a full, clear, and exact description thereof, reference being had to the accompanying drawings, making part of this specification, in which—

Figure 1 is a perspective view of my invention, with a section of the check-rein attached.

Figure 2 is a side elevation of the holder C.

It is very desirable with horsemen to prevent the animal from throwing or swinging its head sidewise as much as most horses are inclined to do. The object of this invention is to provide a simple remedy for this annoyance, and its nature consists in attaching the ordinary check-rein to a metal loop, having a short fixed tongue or spur to pierce the strap and hold it firmly; the loop having an eyelet on one side, by which to attach it to the check-hook.

To enable others to make and use my invention, I will describe its construction and operation.

I make a sort of triangular-shaped loop, C, of any suitable metal. The bar $a$ is provided in the centre with a short tongue or spur $s$. The other two bars $c$ and $e$ terminate in an eyelet $b$, which should be large enough to receive the check-hook of the back-pad of the harness. The freedom with which the rein slips either way, as heretofore applied, around the stem of the hook, is effectually prevented by the application of this holder.

The strap or rein is applied by folding one end to loop around the point of the spur $s$, as indicated by the dotted lines $n$ in fig. 2, and drawing it through far enough to bring the holder about in the centre, and setting the tongue or spur $s$ through the hole at that point in the strap. The two ends of the rein are then buckled into the side straps running down to the bits. If the check-rein only buckles on one side there should be several holes $i$, and they should be made much nearer to each other than the holes for taking up and letting out the check-rein, whereby the holder may be placed centrally when either change is made. The bars $c$ and $e$ are somewhat curved outward, as shown in the drawings, to increase the space between them and the point of the spur $s$, and thereby facilitate the insertion and adjustment of the section of the rein to which the holder is attached.

It may be desirable to apply the spur directly to the stem of the hook on the harness, which would produce the same effect or result as when a separate holder is used.

What I claim as my invention, and desire to secure by Letters Patent, is—

In connection with the ordinary check-rein and hook of harness, the rein-holder constructed and operating substantially in the manner and for the purposes herein shown and described.

McDOWELL DARROW.

Witnesses:
WM. S. LOUGHBOROUGH,
J. L. LUCKEY.